(12) United States Patent
Skidmore et al.

(10) Patent No.: US 6,243,650 B1
(45) Date of Patent: Jun. 5, 2001

(54) METHOD OF DETERMINING NET RESERVOIR THICKNESS

(75) Inventors: Charles M. Skidmore, Tulsa, OK (US); Michael C. Kelly, Spokane, WA (US); Richard Owens Lindsay, Tulsa, OK (US)

(73) Assignee: Diamond Geoscience Research Corporation, Houston, TX (US)

( * ) Notice: Subject to any disclaimer, the term of this patent is extended or adjusted under 35 U.S.C. 154(b) by 0 days.

(21) Appl. No.: 09/393,421

(22) Filed: Sep. 10, 1999

Related U.S. Application Data

(60) Provisional application No. 60/100,019, filed on Sep. 11, 1998.

(51) Int. Cl.$^7$ ............................................... G01V 1/28

(52) U.S. Cl. ............................................................. 702/17
(58) Field of Search ................................. 702/14, 17, 12, 702/13; 703/10; 367/72, 73

(56) References Cited

U.S. PATENT DOCUMENTS 5,136,552 * 8/1992 Kelly et al. ............................. 367/47
5,136,553 * 8/1992 Kelly et al. ............................. 367/52

* cited by examiner

*Primary Examiner*—Donald E. McElheny, Jr.
(74) *Attorney, Agent, or Firm*—Haynes and Boone, LLP

(57) ABSTRACT

The methods of the present invention determine the net and gross thickness of reservoir beds, taking into account the internal structure of reservoir beds, using P-P, and/or S-S and/or P-S seismic data acquired in 2-d or 3-d.

9 Claims, 6 Drawing Sheets

METHOD OF DETERMINING NET RESERVOIR THICKNESS

CROSS REFERENCE TO RELATED APPLICATIONS

This application claims the benefit of U.S. Provisional Application No. 60/100,019, filed Sep. 11, 1998.

BACKGROUND OF THE INVENTION

This invention relates generally to beds, or reservoir layers, and in particular to methods for determining the net and gross thickness of a bed. Hydrocarbon reservoirs in general are not perfect blocky beds, but rather have internal structure in the form of embedded layers of non-reservoir or poor reservoir quality material. However, existing methods for determining gross or net reservoir thickness of these reservoirs ignore or do not accurately consider the internal structure. Thus, those methods have neglected to include effects associated with the internal structure of beds, in the determination of the net and gross thickness of beds.

SUMMARY OF THE INVENTION

The method of the present invention, for the determination of the net and gross thickness of reservoir beds, solves the difficulties of other existing methods, by providing a method that takes into account the internal structure of reservoir beds.

DETAILED DESCRIPTION OF THE INVENTION

Figure 1:
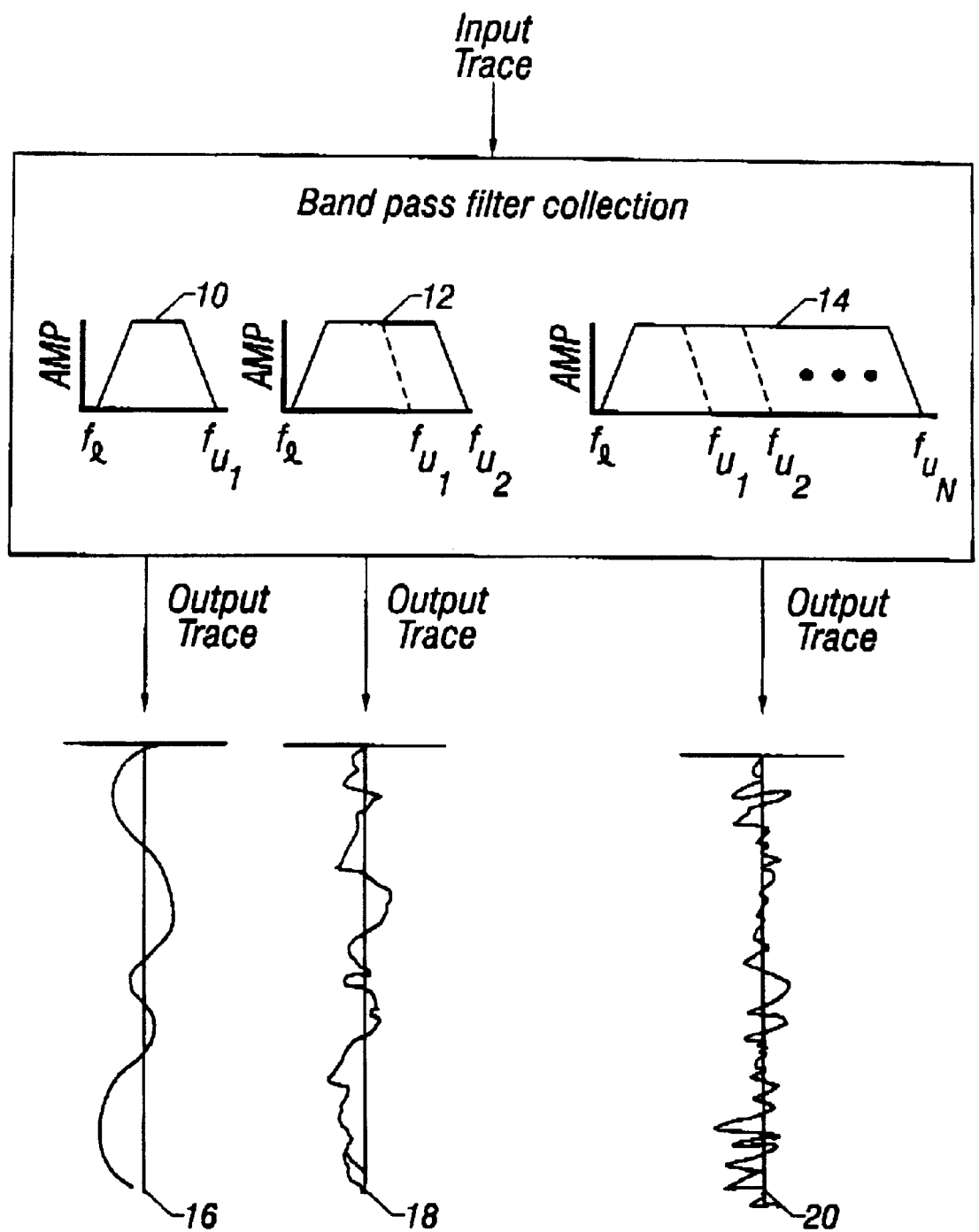
FIG. 1 is an illustration of the band pass filters, and the outputs generated by those filters, used in the method of the present invention.

The methods of the present invention, for determining the gross and net thickness of a reservoir bed, or layer, have in common the following steps. First, as shown in FIG. 1, the seismic data is filtered by a series of band pass filters, 10, 12, 14, each of which has a fixed lower frequency $f_L$ but with progressively higher upper frequency $f_U$. Next, the amplitudes are extracted on a lobe, or sample by sample, basis from filtered seismic traces 16, 18, 20, or from the energy envelope derived from the filtered seismic traces. These amplitude values $A_i$ and the corresponding frequencies $f_{Ui}$, which characterize the filter applied, make up the "amplitude signature" which, as described below, is used to determine the gross and net thickness.

Figure 2:
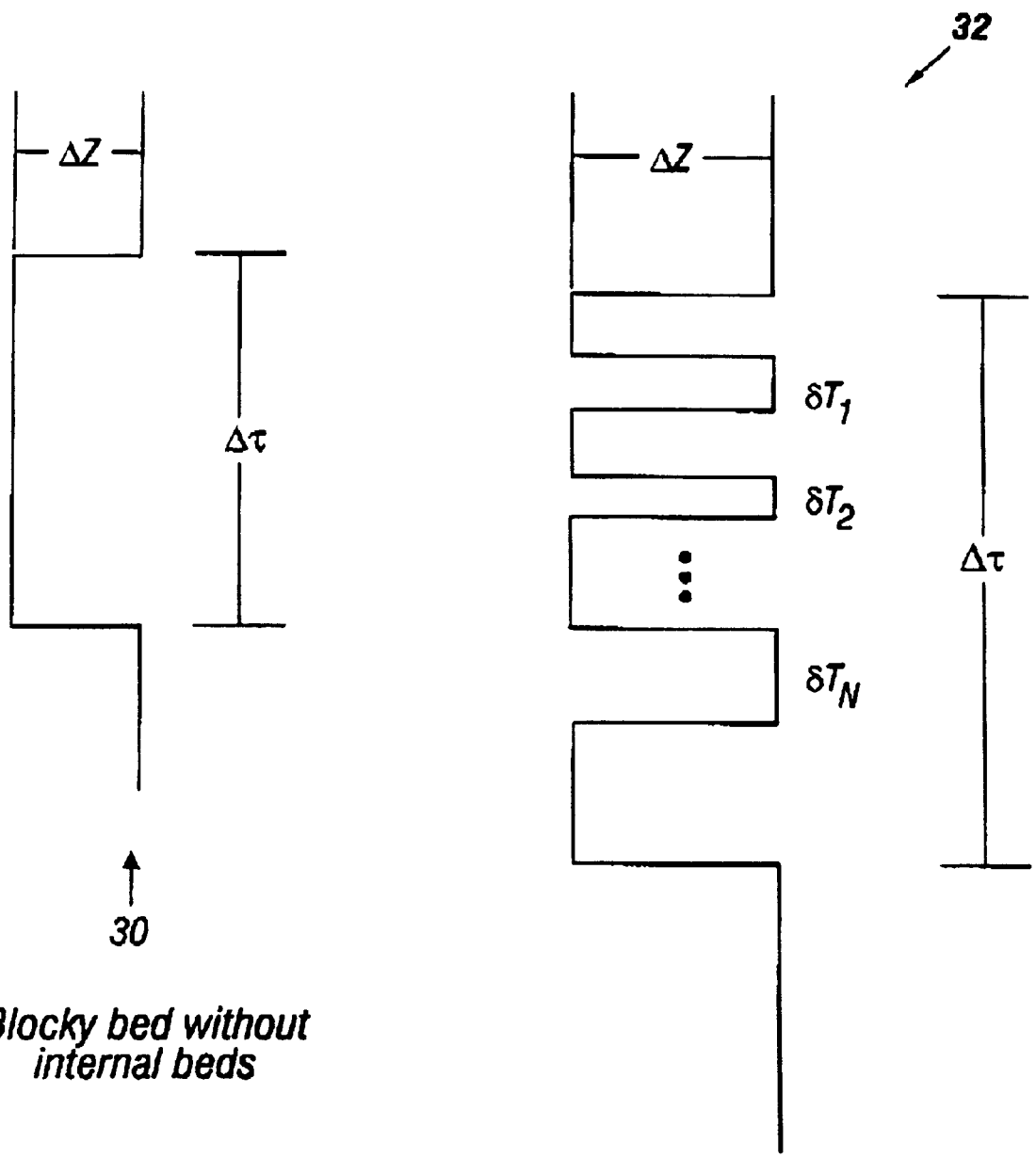
FIG. 2 is a cross-sectional illustration of different types of beds which are analyzed using the method of the present invention.

Referring now to FIG. 2, a variety of types of information is extracted from the amplitude signatures related to the properties of the beds 30, 32 being imaged. These extracted properties will be referred to as Frequency Dependant Attributes or FDA's. The bed geometry described applies for P-P, P-S and S-S data. These time thicknesses $\Delta t$ and $\delta t_i$ are related to each other and to $\Delta Z$ as shown below in equations. For all of the methods described, the relationships between the various thicknesses are defined and related to each other as:

$\Delta Z$=spatial thickness $\Delta t$=gross reservoir thickness in two-way travel time $\delta t_i$=the two-way time thickness of the embedded ith layer; and $\Delta t_{net}=\Delta t-\Sigma \delta t_i$ the net reservoir thickness in two-way travel time For the case of a single embedded bed, the net thickness is:

$\Delta t_{net}=\Delta t-\delta t$=the net reservoir thickness in two-way travel time.

The amplitude signature for a blocky reservoir bed is:

$$AMP(f_U) = \frac{\Delta Zp}{2Zp}\left(1 - \frac{\text{SIN}(\alpha \Delta t f_U)}{\alpha \Delta t f_U}\right) \qquad \text{Equation 1}$$

where $\frac{\Delta Zp}{Zp}$ = the relative impedance contrast for the reservoir;

$\Delta t$ = gross reservoir thickness in two-way travel time;

$f_U$ = the upper frequency of the filter used; and $\alpha = 2\pi$.

Figure 3:
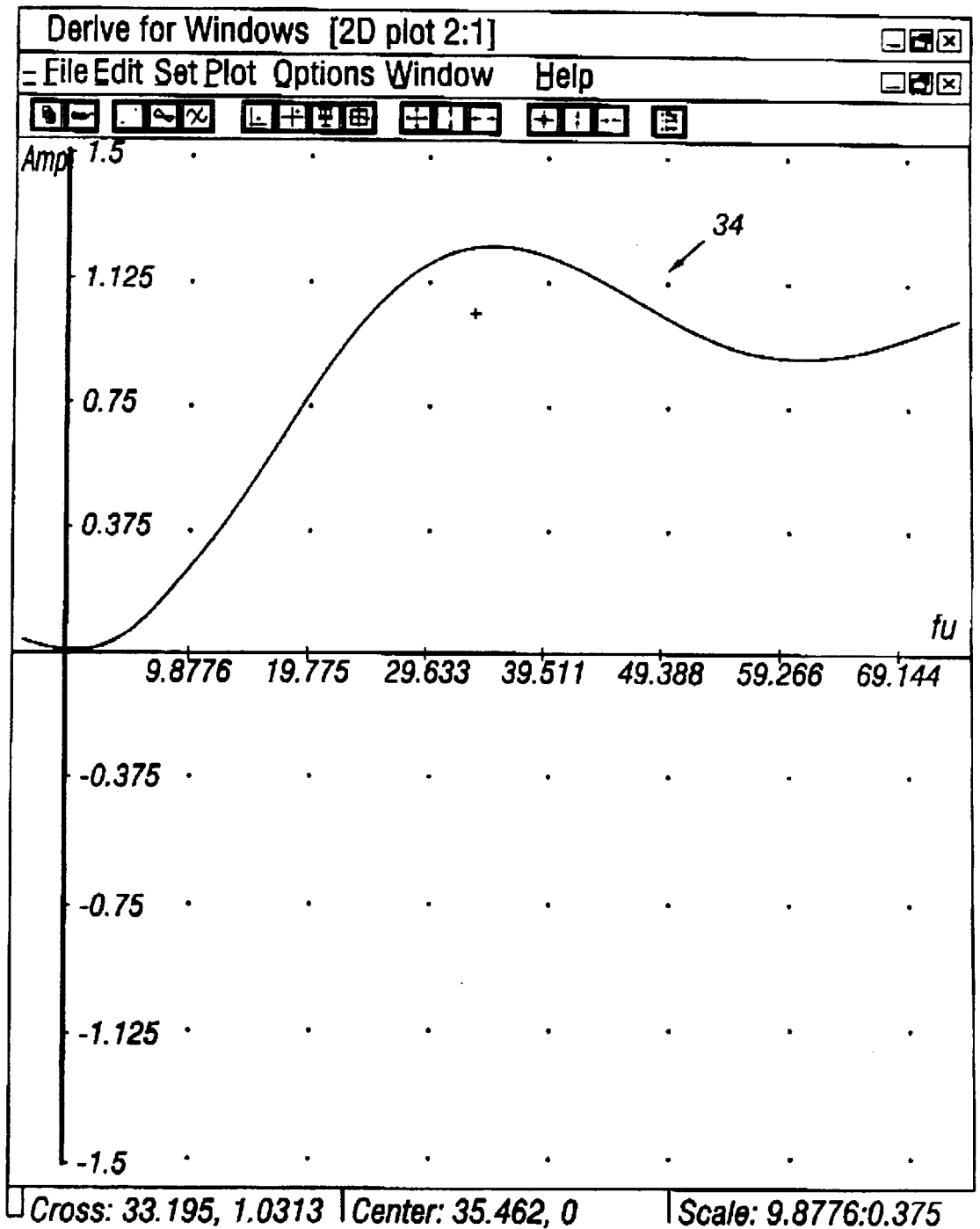
FIG. 3 is an illustration of an amplitude signature of a blocky bed, with an embedded reservoir layer.

FIG. 3 illustrates the amplitude signature 34 given by Equation 1, for the case of $\Delta t$=.02 seconds.

The amplitude signature for a blocky reservoir bed with one or more smaller non-reservoir layers embedded in it is approximately:

$$AMP(f_U) \cong \frac{\Delta Zp}{2Zp}\left[\left(1 - \frac{\text{SIN}(\alpha \Delta t f_U)}{\alpha \Delta t f_U}\right) - \sum_i \left(1 - \frac{\text{SIN}(\alpha \delta t_i f_U)}{\alpha \delta t_i f_U}\right)\right] \qquad \text{Equation 2}$$

where the time reference is the position in the trace where the amplitude is an extrema ("Extrema" means the largest value, regardless of the sign, that is, regardless of whether it is positive or negative), and where $\frac{\Delta Zp}{Zp}$ = the relative impedance contrast for the reservoir;

$\Delta t$ = the two-way time thickness with the reservoir layer;

$\delta t_i$ = the two-way time thickness of the ith layer;

$f_U$ = the upper frequency of the filter; and $\alpha = 2\pi$.

Figure 4:
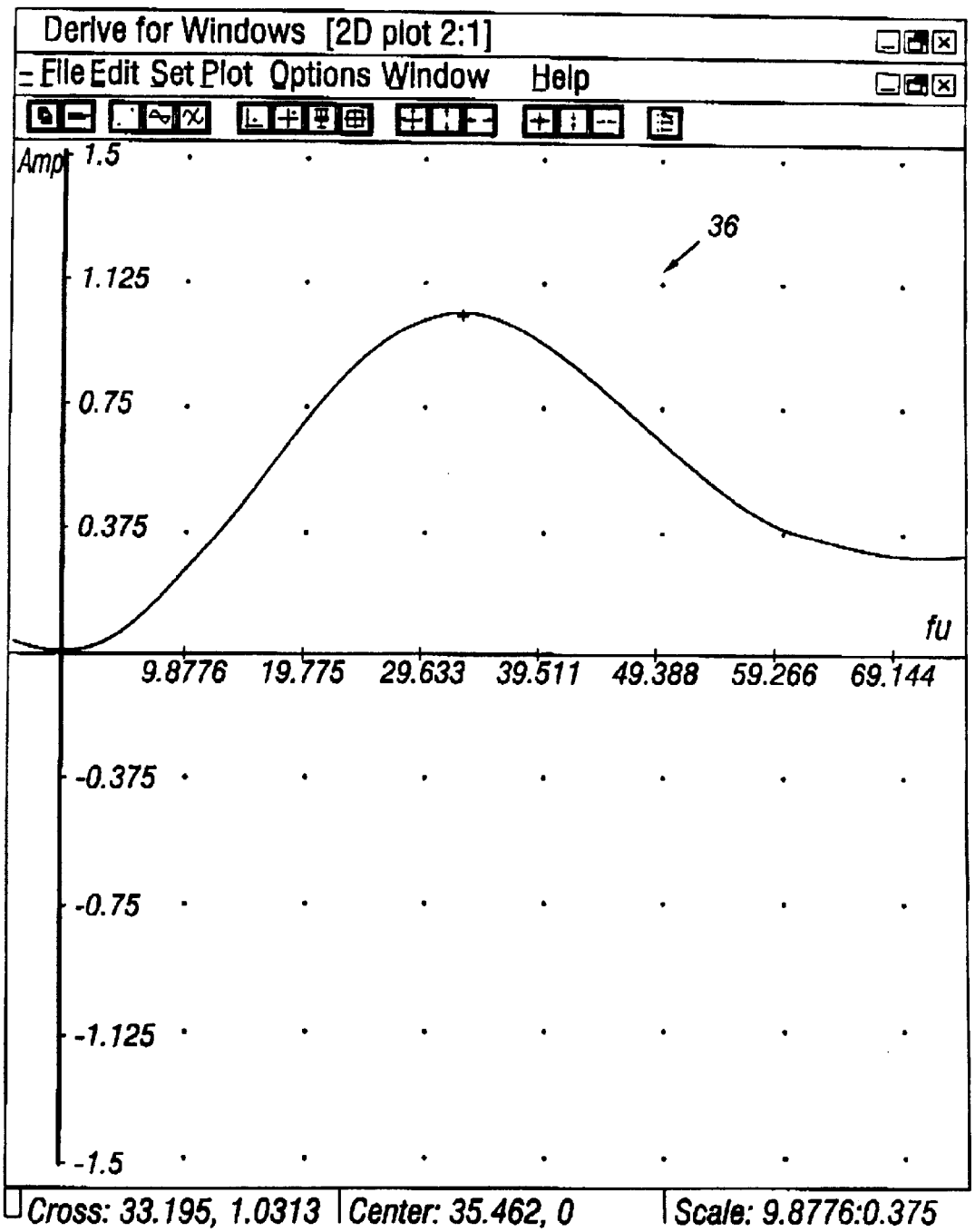
FIG. 4 is an illustration of an amplitude signature of the bed of FIG. 3, with another, thinner bed embedded within it.

FIG. 4 illustrates the amplitude signature 36 for the bed 32, given by Equation 2, for the case of $\Delta t$=0.02 seconds and for a single embedded layer $\delta t_i$=0.005.

Figure 5:
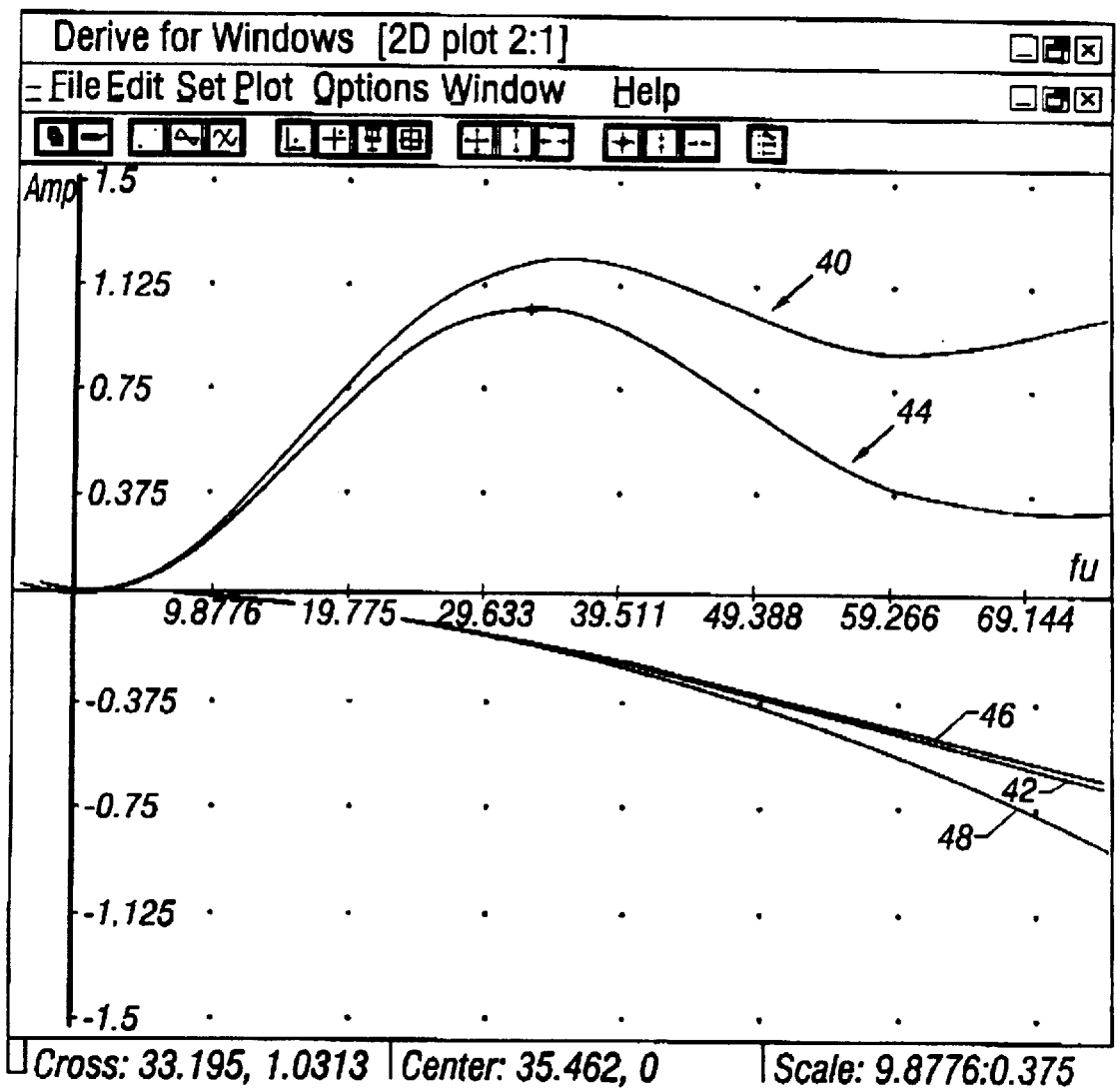
FIG. 5 is an illustration of the amplitude signatures of the beds of FIGS. 3 and 4, with a curve showing the effect of the embedded bed.

Equation 2 reveals that the effect of one or more non-reservoir beds embedded in a thicker reservoir layer is to produce the expected amplitude response of the gross reservoir (see curve 40 in FIG. 5, the black curve), with the polarity reversed amplitude response curve of the unresolved embedded non-reservoir bed (see curve 42 FIG. 5, red curve). The net effect is to produce an amplitude decay with increasing frequency (see curve 44, FIG. 5, green curve). From this amplitude decay with frequency effect, curve 44, the net bed thickness is determined as described below.

For the case of a single embedded layer of thickness $\delta t$:

$$AMP(f_U) \cong \frac{\Delta Zp}{2\overline{Zp}}\left[\left(1 - \frac{\text{SIN}(\alpha \Delta t f_U)}{\alpha \Delta t f_U}\right) - \left(1 - \frac{\text{SIN}(\alpha \delta t f_U)}{\alpha \delta t f_U}\right)\right] \quad \text{Equation 3}$$

where the time reference is the position in the trace where the amplitude is an extrema, and where $\frac{\Delta Zp}{Zp}$ = the relative impedance contrast for the reservoir;

$\Delta t$ = the two-way time thickness with the reservoir layer;

$\delta t_i$ = the two-way time thickness of the embedded layer;

$f_U$ = the upper frequency of the filter; and $\alpha = 2\pi$.

There are situations where there can be distinct advantages obtained by approximating Equations 2 and 3 to give Equations 4 and 5, which take advantage of the fact that the thickness of the embedded beds is less than the gross thickness $\Delta t$. Thus, Equations 4 and 5 are used in a variety of ways as shown below to solve for the gross and net thickness of the bed. Specifically, if an estimate is made for $\Delta t$, then either $\Sigma \delta_i^2$ is found by a linear fitting process (method 3 and 4), or it can be directly solved for $\Sigma \delta_i^2$ and $\Delta t$ as described below (methods 8 and 9).

The amplitude signature for a blocky reservoir bed with one or more smaller non-reservoir layers embedded in it is approximately:

$$AMP(f_U) \cong \frac{\Delta Zp}{2\overline{Zp}}\left[\left(1 - \frac{\text{SIN}(\alpha \Delta t f_U)}{\alpha \Delta t f_U}\right) - \sum_i \frac{2\pi^2}{3}(\delta t_i f_U)^2\right] \quad \text{Equation 4}$$

where the time reference is the position in the trace where the amplitude is an extrema, and where $\frac{\Delta Zp}{Zp}$ = the relative impedance contrast for the reservoir;

$\Delta t$ = the two-way time thickness with the reservoir layer;

$\delta t_i$ = the two-way time thickness of the ith layer;

$f_U$ = the upper frequency of the filter; and $\alpha = 2\pi$.

The amplitude signature for a blocky reservoir bed with a single non-reservoir layer embedded in it, of thickness $\delta t$, is approximately:

$$AMP(f_U) \cong \frac{\Delta Zp}{2\overline{Zp}}\left[\left(1 - \frac{\text{SIN}(\alpha \Delta t f_U)}{\alpha \Delta t f_U}\right) - \frac{2\pi^2}{3}(\delta t f_U)^2\right] \quad \text{Equation 5}$$

where the time reference is the position in the trace where the amplitude is an extrema, and where $\frac{\Delta Zp}{Zp}$ = the relative impedance contrast for the reservoir;

$\Delta t$ = the two-way time thickness with the reservoir layer;

$\delta t_i$ = the two-way time thickness of the embedded layer;

$f_U$ = the upper frequency of the filter; and $\alpha = 2\pi$.

In the case where the accumulated thickness of the embedded layers $\Sigma \delta t_i$ approaches the thickness $\Delta t$, then Equation 2 becomes:

$$AMP(f_U) \cong \frac{\Delta Zp}{2\overline{Zp}}\left[\left(1 - \frac{\text{SIN}(\alpha \Delta t f_U)}{\alpha \Delta t f_U}\right) - \sum_i \frac{2\pi^2}{3}(\delta t_i f_U)^2 + \sum_i \frac{2\pi^4}{15}(\delta t_i f_U)^4\right] \quad \text{Equation 6}$$

where the time reference is the position in the trace where the amplitude is an extrema, and where $\frac{\Delta Zp}{Zp}$ = the relative impedance contrast for the reservoir;

$\Delta t$ = the two-way time thickness with the reservoir layer;

$\delta t_i$ = the two-way time thickness of the embedded layer;

$f_U$ = the upper frequency of the filter; and $\alpha = 2\pi$.

The amplitude signature for a blocky reservoir bed with a single non-reservoir layer embedded in it, of thickness $\delta t$, is approximately given by:

$$AMP(f_U) \cong \frac{\Delta Zp}{2\overline{Zp}}\left[\left(1 - \frac{\text{SIN}(\alpha \Delta t f_U)}{\alpha \Delta t f_U}\right) - \frac{2\pi^2}{3}(\delta t f_U)^2 + \frac{2\pi^4}{15}(\delta t f_U)^4\right] \quad \text{Equation 7}$$

where the time reference is the position in the trace where the amplitude is an extrema, and where $\frac{\Delta Zp}{Zp}$ = the relative impedance contrast for the reservoir;

$\Delta t$ = the two-way time thickness with the reservoir layer;

$\delta t_i$ = the two-way time thickness of the embedded layer;

$f_U$ = the upper frequency of the filter; and $\alpha = 2\pi$.

FIG. 5 illustrates the accuracy of the approximations (curves 46 and 48) for the case where $\Delta t=.02$ seconds, and there is only a single embedded layer of thickness $\delta t=.005$ seconds.

Figure 6:
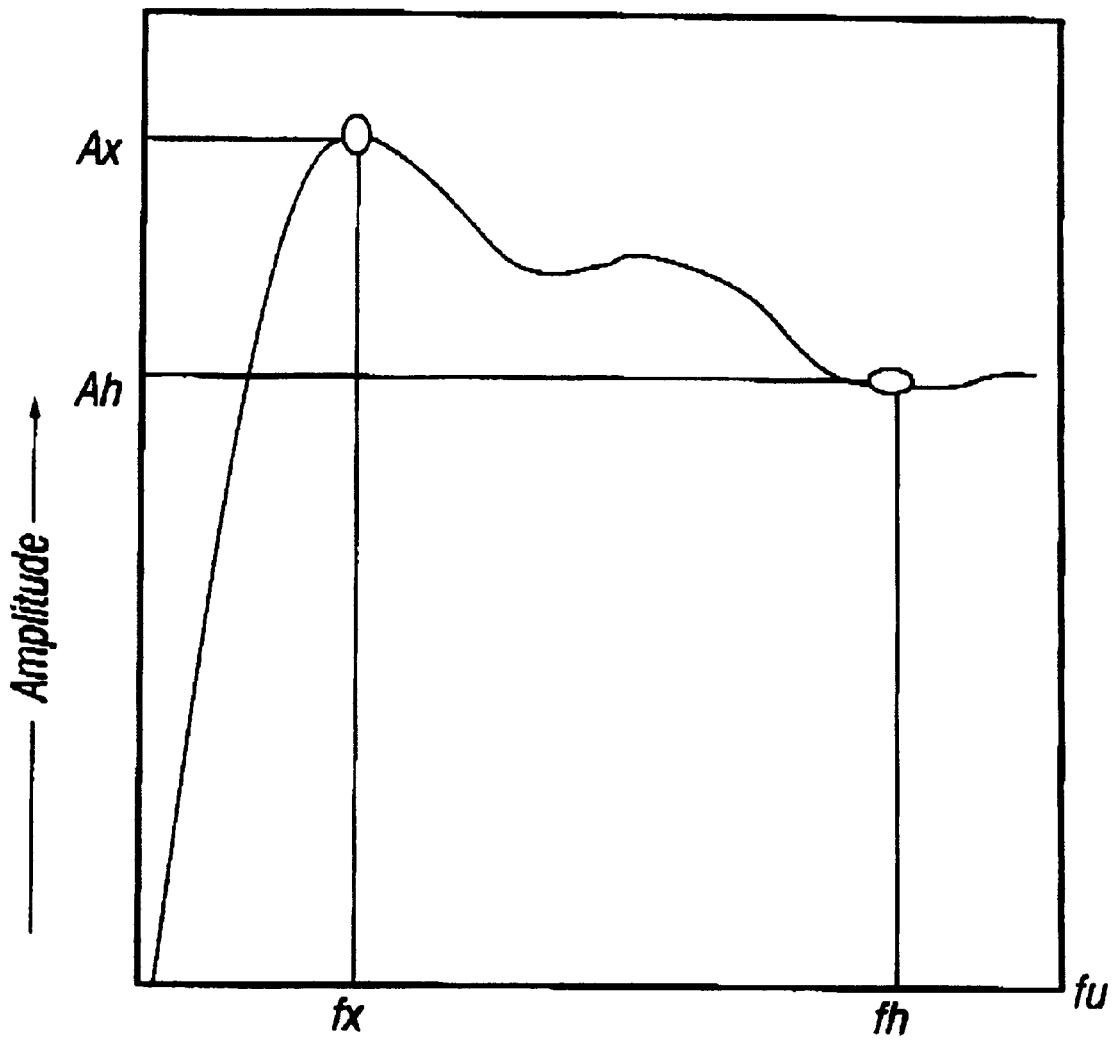
FIG. 6 is an illustration of an amplitude signature of a blocky bed, with embedded non-reservoir layers.

Referring now to FIG. 6, given two measured amplitudes and their corresponding frequencies, Ax, fx and Ah, fh, the gross and net thicknesses are calculated using the following equations:

$$\Delta t = \frac{5}{7fx} - \varepsilon \qquad \text{Equation 8}$$

where $\varepsilon = 2.14 * fx * \Sigma \delta t_i^2$ for the case of more than one embedded layers or
for the case of a single embedded layer $$\delta = 2.14 * fx * \delta t^2$$

and $$\sum \delta t = (1.013) \sqrt{\frac{C_1 f_x \text{SIN}\left[\frac{10\pi f_h}{7 f_x}\right] + C_2 f_h \frac{A_h}{A_x} - C_3 f_h}{C_4 f_h f_x^2 - C_5 f_h^3 - C_6 f_x^3 \text{SIN}\left[\frac{10\pi f_h}{7 f_x}\right]}} \qquad \text{Equation 9}$$

or
for the case of a single embedded layer $$\delta t = (1.013) \sqrt{\frac{C_1 f_x \text{SIN}\left[\frac{10\pi f_h}{7 f_x}\right] + C_2 f_h \frac{A_h}{A_x} - C_3 f_h}{C_4 f_h f_x^2 - C_5 f_h^3 - C_6 f_x^3 \text{SIN}\left[\frac{10\pi f_h}{7 f_x}\right]}}$$

where
$C_1 = 1.299$
$C_2 = 7.10$
$C_3 = 5.83$
$C_4 = 32.36$
$C_5 = 39.39$
$C_6 = 7.211$
$\delta t$ is in seconds.

In all of the discussion above concerning bed thickness, whether net or gross, $\delta T_{2WAY}$ is the two-way travel time for the bed. These travel times are for P-P, P-S, or S-S data types. The spatial thickness $\Delta Z$ of the layer is given, for each of these cases by:

$$\Delta Z = \frac{\Delta T_{pp-2WAY}}{2} \cdot V_{P_{INT}} \qquad \text{Equations 10, 11 and 12}$$

$$\Delta Z = \frac{\Delta T_{ss-2WAY}}{2} \cdot V_{S_{INT}}$$

$$\Delta Z = T_{PS} \cdot \left(\frac{V_p \cdot V_s}{V_p + V_s}\right)$$

where:
$\Delta T_{PP-2WAY}$ = the 2-way P-P travel time;
$\Delta T_{SS-2WAY}$ = the 2-way S-S travel time;
$\Delta T_{PS-2WAY}$ = the 2-way P-DOWN S-UP travel time; and
$\Delta Z$ = the thickness of the layer.

There are a number of methods for quantitatively determining the gross and net bed thicknesses of a reservoir layer using the above equations. They include:

1) Perform a nonlinear fit, using Equation 2, to amplitude and $fu_i$ pairs to produce optimal data consistent values for $\Delta t$, $\delta t_i$ and $\Delta Zp/Zp$. $\Delta t$, $\delta t_i$ and $\Delta Zp/Zp$ are the data derived FDA's for this method.

2) Perform a nonlinear fit, using Equation 3, to amplitude and $f_{Ui}$ pairs to produce optimal data consistent values for $\Delta t$, $\delta t$ and $\Delta Zp/Zp$ for the case where only a single embedded layer is present. $\Delta t$, $\delta t$ and $\Delta Zp/Zp$ are the data derived FDA's for this method.

3) Derive Equation 4 by simplifying Equation 2 by taking advantage of the fact that the total thickness of the layers $t_i$ are small compared with $\Delta$. The value for $\Delta t$ is initially estimated by finding the frequency for which the amplitude is at its maximum $fx$ (see FIG. 6) and then substituting $\Delta t = 1(1.4 * fx)$. Next, perform a linear fit, using Equation 4, to amplitude and $fu_i$ pairs to produce optimal data consistent values for $(\Sigma \delta t_i^2)$ and $\Delta Zp/Zp$. With this initial estimate of $\Sigma \delta t_i^2$, Equation 8 is used to improve the initial estimate made for the gross thickness $\Delta t$. This improved value for $\Delta t$ is substituted into Equation 4, and a new fit performed, resulting in an improved estimate for $\Sigma \delta t_i^2$. FIG. 5 illustrates the accuracy of this approach. The red curve, curve 42, represents the exact response while the approximate form, Equation 4, is the cyan curve, curve 48. $\Delta t$, $\delta t_i$ and $\Delta Zp/Zp$ are the data derived FDA's for this method.

4) Simplify Equation 3 by taking advantage of the fact that the thickness of the embedded layer $\delta t$ is small compared with $\Delta t$ for the case where only a single embedded layer is present. This gives Equation 5. The value for $\Delta t$ is initially estimated by finding the frequency for which the amplitude is at its maximum $fx$ (see FIG. 6) and then substituting $\Delta t = 1/(1.4 * fx)$. Then a linear fit to the data is made, using Equation 5, to amplitude and $f_{Ui}$ pairs to produce optimal data consistent values for $(\delta t^2)$ and $\Delta Zp/Zp$. With this initial estimate of $\delta t^2$, Equation 8 is used to improve the initial estimate made for the gross thickness $\Delta t$. This improved value for $\Delta t$ is substituted into Equation 5, and a new fit performed, resulting in an improved estimate for $\delta t^2$. $\Delta t$, $\delta t$ and $\Delta Zp/Zp$ are the data derived FDA's for this method.

5) In the case where the thickness of the embedded layer approaches the reservoir thickness, then an improved approximation to Equations 4 and 5 are 6 and 7 respectively. These equations result from simplifying Equation 2 by taking advantage of the fact that the total thickness of the layers $\delta t_i$ are small compared with $\Delta t$. This gives Equation 6. The value for $\Delta t$ is initially estimated by finding the frequency for which the amplitude is at a maximum $fx$ (see FIG. 6) and then substituting $\Delta t = 1(1.4 * fx)$. Perform a non-linear fit, using Equation 6, to amplitude and $f_{Ui}$ pairs to produce optimal data consistent values for $(\Sigma \delta t_i^2)$ and $\Delta Zp/Zp$. With this initial estimate of $\Sigma \delta t_i^2$, Equation 8 is used to improve the initial estimate made for the gross thickness $\Delta t$. This improved value for $\Delta t$ is substituted into Equation 4, and a new fit is performed, resulting in an improved estimate for $\Sigma \delta t_i^2$. FIG. 5 illustrates the accuracy of this approach. The red curve (curve 42) represents the exact response, while the approximate form, indicated in Equation 6, is the dark blue curve, curve 46. $\Delta t$, $\delta t_i$ and $\Delta Zp/Zp$ are the data derived FDA's for this method.

6) For the case where only a single embedded layer is present it is possible to simplify Equation 6 by taking advantage of the fact that the thickness of the embedded layer $\delta t$ is somewhat small compared with $\Delta t$. This gives Equation 7. The value for $\Delta t$ is initially estimated by finding the frequency for which the amplitude is at a maximum $fx$ (see FIG. 6), and then substituting $\Delta t = 1/(1.4 * fx)$. Then a non-linear fit to the data is made, using Equation 7, to amplitude and $fu$ pairs to produce optimal data consistent values for $(\delta t^2)$ and $\Delta Zp/Zp$. With this initial estimate of $\delta t^2$, Equation 8 is used to improve the initial estimate made for the gross thickness $\Delta t$. This improved value for $\Delta t$ is substituted into Equation 7, and a new fit is performed, resulting in an improved estimate for $\delta t^2$. $\Delta t$, $\delta t$ and $\Delta Zp/Zp$ are the data derived FDA's for this method.

The final 2 methods do not require any type of linear or nonlinear curve fitting.

7) This method assumes the total thickness of the embedded layers is less than the gross bed thickness. In this case the gross and embedded bed thicknesses are solved for by using Equation 4. The result is Equations 8 and 9. All that is required are two amplitude measurements, Ax and Ah, and their corresponding frequencies, fx and fh, where the first measurement is made where the amplitude is at its maximum (Ax,fx) and the second is for a frequency at least 10% higher than the frequency where the amplitude is at its maximum. These are Ah and fh. This arrangement is shown in FIG. 6. The value for $\Sigma \delta t_i$ is given by Equation 9, while the value for the gross thickness is given by Equation 8. $\Delta t$, and $\Sigma \delta t_i$ are the data derived FDA's for this method.

8) This method assumes the total thickness of the embedded layers is less than the gross bed thickness, and that there is only a single embedded layer present. In this case the gross and embedded bed thicknesses are solved for by using Equation 5. The result is Equations 8 and 9. All that is required are two amplitude measurements, Ax and Ah, and their corresponding frequencies, fx and fh, where the first measurement is made where the amplitude is at its maximum (Ax, fx) and the second is for a frequency at least 10% higher than the frequency where the amplitude is at its maximum. These are Ah and fh. This arrangement is shown in FIG. 6. The value for $\delta t$ is given by Equation 9, while the value for the gross thickness is given by Equation 8. $\Delta t$, and $\delta t_i$ are the data derived FDA's for this method.

In summary, the following methods of exploration and evaluation have been shown:

1. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   a) determining the gross reservoir thickness $\Delta t$ and the thickness of the non-reservoir material $\Sigma \delta_1$, using the extracted amplitude frequency pairs $A_i$ and the $f_{Ui}$; and
   d) determining the net thickness of the reservoir by $$\Delta t_{NET} = \Delta t - \sum_i \delta t_i$$

2. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) fitting the amplitude and frequency pairs $A_i$ and $f_{Ui}$ to the following equation, using nonlinear fitting methods, $$AMP(f_U) \cong \frac{\Delta Zp}{2Zp}\left[\left(1 - \frac{SIN(\alpha \Delta t f_U)}{\alpha \Delta t f_U}\right) - \sum_i \left(1 - \frac{SIN(\alpha \delta t_i f_U)}{\alpha \delta t_i f_U}\right)\right]$$

to generate fit parameters $\Delta t$, $E\delta t_i$, and $$\frac{\Delta Z_p}{Z_p};$$

d) using the fit parameters $\Delta t$ and $\Sigma \delta_i$, determining the net thickness of the reservoir by using $$\Delta t_{NET} = \Delta t - \sum_i \delta t_i,$$

and e) using the gross thickness $\Delta t$ and the net thickness of the reservoir $$\Delta t_{NET} = \Delta t - \sum_i \delta t_i,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot Vp_{INT}$$

$$\Delta Z = \frac{\Delta T_{ss-2WAY}}{2} \cdot Vs_{INT}$$

$$\Delta Z = T_{PS} \cdot \left(\frac{Vp \cdot Vs}{Vp + Vs}\right)$$

depending on whether the data type is P-P, S-S or P-S respectively.

3. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$ to generate filtered seismic traces;

b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;

a) in the case where only a single embedded layer of thickness $\delta t$ is present, using nonlinear fitting methods, fitting the amplitude and frequency pairs $A_i$ and $f_{Ui}$ to the following equation, $$AMP(f_U) \cong \frac{\Delta Z_p}{2\overline{Z_p}}\left[\left(1 - \frac{\text{SIN}(\alpha \Delta t f_U)}{\alpha \Delta t f_U}\right) - \left(1 - \frac{\text{SIN}(\alpha \delta t f_U)}{\alpha \delta t f_U}\right)\right]$$

to generate fit parameters $\Delta t$, $\delta t$, and $$\frac{\Delta Z_p}{Z_p};$$

d) using the fit parameters $\Delta t$ and $\delta t$, determining the net thickness of the reservoir by using $\Delta_{iNET} = \Delta t - \delta t$; and f) using the gross thickness $\Delta t$ and the net thickness of the reservoir $\Delta_{iNET} = \Delta t - \delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot V p_{INT}$$

$$\Delta Z = \frac{\Delta T_{ss-2WAY}}{2} \cdot V s_{INT}$$

$$\Delta Z = T_{PS} \cdot \left(\frac{Vp \cdot Vs}{Vp + Vs}\right)$$

depending on whether the data type is P-P, S-S or P-S respectively.

4. A method of determining the net thickness of a reservoir bed, comprising the following steps:

a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;

b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;

c) determining the frequency fx at which the amplitudes are at their maximum value by analyzing the amplitude frequency pairs $A_i$ and $f_i$;

d) using linear fitting methods, and using $\Delta t = 1/(1.4 * fx)$, fitting the amplitude and frequency pairs $A_i$ and $f_{Ui}$ to the following equation, $$AMP(f_U) \cong \frac{\Delta Z p}{2\overline{Z p}}\left[\left(1 - \frac{\text{SIN}(\alpha \Delta t f_U)}{\alpha \Delta t f_U}\right) - \sum_i \frac{2\pi^2}{3} (\delta t_i f_U)^2\right]$$

to generate fit parameters $\Delta t$, $\Sigma \delta t_i$, and $$\frac{\Delta Z_p}{Z_p};$$

e) substituting the fit parameter $\Sigma \delta t_i$ into $$\Delta t = \frac{5}{7 fx} - \varepsilon \text{ where } \varepsilon = 2.14 * fx * \sum \delta t_i^2$$

to produce an improved estimate of $\Delta t$;

f) fitting the amplitude and frequency pairs $A_i$ and $f_{Ui}$ to the following equation, using linear fitting methods, and using the improved estimate of $\Delta t$, $$AMP(f_U) \cong \frac{\Delta Z p}{2\overline{Z p}}\left[\left(1 - \frac{\text{SIN}(\alpha \Delta t f_U)}{\alpha \Delta t f_U}\right) - \sum_i \frac{2\pi^2}{3} (\delta t_i f_U)^2\right]$$

to generate new fit parameters $\Delta t$, $\Sigma \delta t_i$, and $$\frac{\Delta Z_p}{Z_p};$$

g) using the new fit parameters $\Delta t$ and $\Sigma \delta t_i$, determining the net thickness of the reservoir by $$\Delta t_{NET} = \Delta t - \sum_i \delta t_i;$$

and g) using the gross thickness $\Delta t$ and the net thickness of the reservoir $$\Delta t_{NET} = \Delta t - \sum_i \delta t_i,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot V p_{INT}$$

$$\Delta Z = \frac{\Delta T_{ss-2WAY}}{2} \cdot V s_{INT}$$

$$\Delta Z = T_{PS} \cdot \left(\frac{Vp \cdot Vs}{Vp + Vs}\right)$$

depending on whether the data type is P-P, S-S or P-S respectively.

5. A method of determining the net thickness of a reservoir bed, comprising the following steps:

a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;

b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;

a) in the case where only a single embedded layer of thickness $\delta t$ is present, determining the frequency fx at which the amplitudes are at their maximum value by analyzing the amplitude frequency pairs $A_i$ and $f_{Ui}$;

d) using linear fitting methods, and using $\Delta t=1/(1.4*fx)$, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha \Delta tf_U)}{\alpha \Delta tf_U}\right) - \frac{2\pi^2}{3}(\delta tf_U)^2\right]$$

to generate fit parameters $\Delta t$, $\delta$, and $$\frac{\Delta Z_p}{Z_p};$$

e) substituting the fit parameter $\delta t$ into the following equation, $$\Delta t = \frac{5}{7fx} - \varepsilon \text{ where}$$

$\epsilon = 2.14 * fx * \delta t^2$ to produce an improved estimate of $\Delta t$;

f) using the improved estimate of $\Delta t$, and using linear fitting methods, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha \Delta tf_U)}{\alpha \Delta tf_U}\right) - \frac{2\pi^2}{3}(\delta tf_U)^2\right]$$

to generate new fit parameters $\Delta t$, $\delta t$, and $$\frac{\Delta Z_p}{Z_p};$$

g) using the new fit parameters $\Delta t$ and $\delta t$, determining the net thickness of the reservoir by $\Delta_{iNET}=\Delta t-\delta t$; and h) using the gross thickness $\Delta t$ and the net thickness of the reservoir $\Delta_{iNET}=\Delta t-\delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot Vp_{INT}$$

-continued $$\Delta Z = \frac{\Delta T_{ss-2WAY}}{2} \cdot Vs_{INT}$$

$$\Delta Z = T_{PS} \cdot \left(\frac{Vp \cdot Vs}{Vp + Vs}\right)$$

depending on whether the data type is P-P, S-S or P-S respectively.

6. A method of determining the net thickness of a reservoir bed, comprising the following steps:

a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;

b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;

c) determining the frequency fx at which the amplitudes are at their maximum value by analyzing the amplitude frequency pairs $A_i$ and $f_{Ui}$;

d) using linear fitting methods, and using $\Delta t=1/(1.4*fx)$, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha \Delta tf_U)}{\alpha \Delta tf_U}\right) - \frac{2\pi^2}{3}(\delta tf_U)^2 + \frac{2\pi^4}{15}(\delta tf_U)^4\right]$$

to generate fit parameters $\Delta t$, $\Sigma \delta t_i$, and $$\frac{\Delta Z_p}{Z_p};$$

e) substituting the fit parameter $\Sigma \delta t_i$ into $$\Delta t = \frac{5}{7fx} - \varepsilon,$$

where $\epsilon = 2.14*fx*\Sigma \delta t_i^2$, to produce an improved estimate of $\Delta t$;

f) using the improved estimate of $\Delta t$, and using linear fitting methods, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha \Delta tf_U)}{\alpha \Delta tf_U}\right) - \frac{2\pi^2}{3}(\delta tf_U)^2 + \frac{2\pi^4}{15}(\delta tf_U)^4\right]$$

to generate new fit parameters $\Delta t$, $\Sigma \delta t_i$, and $$\frac{\Delta Z_p}{Z_p};$$

g) using the new fit parameters $\Delta t$ and $\Sigma \delta t_i$, determining the net thickness of the reservoir by $$\Delta_{t_{NET}} = \Delta t - \sum_i \delta t_i;$$

h) using the gross thickness $\Delta t$ and the net thickness of the reservoir $$\Delta_{t_{NET}} = \Delta t - \sum_i \delta t_i,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot V p_{INT}$$

$$\Delta Z = \frac{\Delta T_{ss-2WAY}}{2} \cdot V s_{INT}$$

$$\Delta Z = T_{PS} \cdot \left( \frac{Vp \cdot Vs}{Vp + Vs} \right)$$

depending on whether the data type is P-P, S-S or P-S respectively.

7. A method of determining the net thickness of a reservoir bed, comprising the following steps:
 a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
 b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
 a) in the case where only a single embedded layer of thickness $\delta t$ is present, determining the frequency fx at which the amplitudes are at their maximum value by analyzing the amplitude frequency pairs $A_i$ and $f_{Ui}$;
 d) using linear fitting methods, and using $\Delta t = 1/(1.4*fx)$, fitting the amplitude and frequency pairs $A_i$ and $f_{Ui}$ to the following equation, $$AMP(f_U) \cong \frac{\Delta Zp}{2\overline{Zp}} \left[ \left( 1 - \frac{SIN(\alpha \Delta t f_U)}{\alpha \Delta t f_U} \right) - \frac{2\pi^2}{3}(\delta t f_U)^2 + \frac{2\pi^4}{15}(\delta t f_U)^4 \right]$$

to generate fit parameters $\Delta t$, $\delta t$, and $$\frac{\Delta Z_p}{Z_p};$$

e) substituting the fit parameter $\delta t$ into the following equation, $$\Delta t = \frac{5}{7fx} - \varepsilon,$$

where $\varepsilon = 2.14 * fx * \delta t^2$ to produce an improved estimate of $\Delta t$;
 f) using the improved estimate of $\Delta t$, and using linear fitting methods, fitting the amplitude and frequency pairs $A_i$ and $f_{Ui}$ to the following equation, $$AMP(f_U) \cong \frac{\Delta Zp}{2\overline{Zp}} \left[ \left( 1 - \frac{SIN(\alpha \Delta t f_U)}{\alpha \Delta t f_U} \right) - \frac{2\pi^2}{3}(\delta t f_U)^2 + \frac{2\pi^4}{15}(\delta t f_U)^4 \right]$$

to generate new fit parameters $\Delta t$, $\delta t$, and $$\frac{\Delta Z_p}{Z_p};$$

g) using the new fit parameters $\Delta t$ and $\delta t$, determining the net thickness of the reservoir by $\Delta_{t_{NET}} = \Delta t - \delta t$; and
 h) using the gross thickness $\Delta t$ and the net thickness of the reservoir $\Delta_{t_{NET}} = \Delta t - \delta t$,
determining the spatial thickness $\Delta Z$ and $\Delta Z_{NET}$ using an equation from the group consisting of the following three equations:

$$\Delta Z = \frac{\Delta T_{pp-2WAY}}{2} \cdot V p_{INT}$$

$$\Delta Z = \frac{\Delta T_{ss-2WAY}}{2} \cdot V s_{INT}$$

$$\Delta Z = T_{PS} \cdot \left( \frac{Vp \cdot Vs}{Vp + Vs} \right)$$

depending on whether the data type is P-P, S-S or P-S respectively.

8. A method of determining the net thickness of a reservoir bed, comprising the following steps:
 a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
 b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
 c) extracting two amplitude measurements fx and fh and their corresponding frequencies fx and fh from the amplitude frequency data where the first measurement is made where the amplitude is at its maximum (Ax, fx) and the second is for a frequency at least 10% higher than the frequency where the amplitude is at its maximum;

a) determining $\Sigma\delta\tau$, using the following equation, $$\sum \delta t = (1.013) \sqrt{\frac{C_1 f_x \mathrm{SIN}\left[\frac{10\pi f_h}{7 f_x}\right] + C_2 f_h \frac{A_h}{A_x} - C_3 f_h}{C_4 f_h f_x^2 - C_5 f_h^3 - C_6 f_x^3 \mathrm{SIN}\left[\frac{10\pi f_h}{7 f_x}\right]}}$$

e) determining $\Delta t$, using $$\Delta t = \frac{5}{7 f x} - \varepsilon,$$

where $\epsilon = 2.14 * fx * E\delta t_i^2;$ f) using $\Delta t$ and $\Sigma\delta\tau$, determining the net thickness of the reservoir by using $$\Delta_{t_{NET}} = \Delta t - \sum_i \delta t;$$

and;

g) using the gross thickness $\Delta t$ and the net thickness of the reservoir $$\Delta_{t_{NET}} = \Delta t - \sum_i \delta t,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot V_{p_{INT}}$$

$$\Delta Z = \frac{\Delta T_{ss-2WAY}}{2} \cdot V_{s_{INT}}$$

$$\Delta Z = T_{PS} \cdot \left(\frac{Vp \cdot Vs}{Vp + Vs}\right)$$

depending on whether the data type is P-P, S-S or P-S respectively.

9. A method of determining the net thickness of a reservoir bed, comprising the following steps:
a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$ to generate filtered seismic traces;
a) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
a) in the case where only a single embedded layer of thickness $\delta t$ is present, extracting two amplitude measurements fx and fh and their corresponding frequencies fx and fh from the amplitude frequency data where the first measurement is made where the amplitude is at its maximum (Ax, fx) and the second is for a frequency at least 10% higher than the frequency where the amplitude is at its maximum;
c) determining $\delta\tau$, using $$\delta t = (1.013) \sqrt{\frac{C_1 f_x \mathrm{SIN}\left[\frac{10\pi f_h}{7 f_x}\right] + C_2 f_h \frac{A_h}{A_x} - C_3 f_h}{C_4 f_h f_x^2 - C_5 f_h^3 - C_6 f_x^3 \mathrm{SIN}\left[\frac{10\pi f_h}{7 f_x}\right]}}$$

d) determining $\Delta t$, using $$\Delta t = \frac{5}{7 f x} - \varepsilon,$$

where $\epsilon = 2.14 * fx * \delta t^2$ e) using $\Delta t$ and $\delta\tau$, determining the net thickness of the reservoir by using $\Delta_{iNet} = \Delta t - \delta t$; and
i) using the gross thickness $\Delta t$ and the net thickness of the reservoir $\Delta_{iNET} = \Delta t - \delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot V_{p_{INT}}$$

$$\Delta Z = \frac{\Delta T_{ss-2WAY}}{2} \cdot V_{s_{INT}}$$

$$\Delta Z = T_{PS} \cdot \left(\frac{Vp \cdot Vs}{Vp + Vs}\right)$$

depending on whether the data type is P-P, S-S or P-S respectively.

Although this detailed description has shown and described illustrative embodiments of the invention, this description contemplates a wide range of modifications, changes, and substitutions. In some instances, one may employ some features of the present invention without a corresponding use of the other features. Accordingly, it is appropriate that readers should construe the appended claims broadly, and in a manner consistent with the scope of the invention.

What is claimed is:
1. A method of determining the net thickness of a reservoir bed, comprising the following steps:
a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$ to generate filtered seismic traces;
b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
c) determining the gross reservoir thickness $\Delta t$ and the thickness of the non-reservoir material $\Sigma\delta_1$, using the extracted amplitude frequency pairs $A_i$ and the $f_{Ui}$; and d) determining the net thickness of the reservoir by $$\Delta_{t_{NET}} = \Delta t - \sum_i \delta t_i.$$

2. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) fitting the amplitude and frequency pairs $A_i$ and $f_{Ui}$ to the following equation, using nonlinear fitting methods, $$AMP(f_U) \cong \frac{\Delta Z_p}{2\overline{Z}_p}\left[\left(1 - \frac{SIN(\alpha \Delta t f_U)}{\alpha \Delta t f_U}\right) - \sum_i \left(1 - \frac{SIN(\alpha \delta t_i f_U)}{\alpha \delta t_i f_U}\right)\right]$$

to generate fit parameters $\Delta t$, $\Sigma \delta t_1$, and $$\frac{\Delta Z_p}{Z_p};$$

d) using the fit parameters $\Delta t$ and $\Sigma \delta t_1$, determining the net thickness of the reservoir by using $$\Delta_{t_{NET}} = \Delta t - \sum_i \delta t_i;$$

and
   e) using the gross thickness $\Delta t$ and the net thickness of the reservoir $$\Delta_{t_{NET}} = \Delta t - \sum_i \delta t_i,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot V_{p_{INT}}$$

$$\Delta Z = \frac{\Delta T_{ss-2WAY}}{2} \cdot V_{S_{INT}}$$

$$\Delta Z = T_{PS} \cdot \left(\frac{Vp \cdot Vs}{Vp + Vs}\right).$$

3. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) in the case where only a single embedded layer of thickness $\delta t$ is present, using nonlinear fitting methods, fitting the amplitude and frequency pairs $A_i$ and $f_{Ui}$ to the following equation, $$AMP(f_U) \cong \frac{\Delta Z_p}{2\overline{Z}_p}\left[\left(1 - \frac{SIN(\alpha \Delta t f_U)}{\alpha \Delta t f_U}\right) - \left(1 - \frac{SIN(\alpha \delta t f_U)}{\alpha \delta t f_U}\right)\right]$$

to generate fit parameters $\Delta t$, $\delta t$, and $$\frac{\Delta Z_p}{Z_p};$$

d) using the fit parameters $\Delta t$ and $\delta t$, determining the net thickness of the reservoir by using $\Delta_{iNET}=\Delta t - \delta t$; and
   e) using the gross thickness $\Delta t$ and the net thickness of the reservoir $\Delta_{iNET}=\Delta t - \delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot V_{p_{INT}}$$

$$\Delta Z = \frac{\Delta T_{ss-2WAY}}{2} \cdot V_{S_{INT}}$$

$$\Delta Z = T_{PS} \cdot \left(\frac{Vp \cdot Vs}{Vp + Vs}\right).$$

4. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) determining the frequency fx at which the amplitudes are at their maximum value by analyzing the amplitude frequency pairs $A_i$ and $f_i$;
   d) using linear fitting methods, and using $\Delta t=1/(1.4*fx)$, fitting the amplitude and frequency pairs $A_i$ and $f_{Ui}$ to the following equation, $$AMP(f_U) \cong \frac{\Delta Z p}{2\overline{Z p}}\left[\left(1 - \frac{\text{SIN}(\alpha \Delta t f_U)}{\alpha \Delta t f_U}\right) - \sum_i \frac{2\pi^2}{3}(\delta t_i f_U)^2\right]$$

to generate fit parameters $\Delta t$, $\Sigma \delta t_i$, and $$\frac{\Delta Z_p}{Z_p};$$

e) substituting the fit parameter $\Sigma \delta t_i$ into $$\Delta t = \frac{5}{7fx} - \varepsilon \text{ where } \varepsilon = 2.14 * fx * \sum \delta t_i^2$$

to produce an improved estimate of $\Delta t$;

f) fitting the amplitude and frequency pairs $A_i$ and $f_{Ui}$ to the following equation, using linear fitting methods, and using the improved estimate of $\Delta t$, $$AMP(f_U) \cong \frac{\Delta Z p}{2\overline{Z p}}\left[\left(1 - \frac{\text{SIN}(\alpha \Delta t f_U)}{\alpha \Delta t f_U}\right) - \sum_i \frac{2\pi^2}{3}(\delta t_i f_U)^2\right]$$

to generate new fit parameters $\Delta t$, $\Sigma \delta t_i$, and $$\frac{\Delta Z_p}{Z_p};$$

g) using the new fit parameters $\Delta t$ and $\Sigma \delta t_i$, determining the net thickness of the reservoir by $$\Delta t_{NET} = \Delta t - \sum_i \delta t_i;$$

and h) using the gross thickness $\Delta t$ and the net thickness of the reservoir $$\Delta t_{NET} = \Delta t - \sum_i \delta t_i,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot V_{p_{INT}}$$

$$\Delta Z = \frac{\Delta T_{ss-2WAY}}{2} \cdot V_{S_{INT}}$$

$$\Delta Z = T_{PS} \cdot \left(\frac{Vp \cdot Vs}{Vp + Vs}\right).$$

5. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) in the case where only a single embedded layer of thickness $\delta t$ is present, determining the frequency fx at which the amplitudes are at their maximum value by analyzing the amplitude frequency pairs $A_i$ and $f_{Ui}$;
   d) using linear fitting methods, and using $\Delta t = 1/(1.4 * fx)$, fitting the amplitude and frequency pairs $A_i$ and $f_{Ui}$ to the following equation, $$AMP(f_U) \cong \frac{\Delta Z p}{2\overline{Z p}}\left[\left(1 - \frac{\text{SIN}(\alpha \Delta t f_U)}{\alpha \Delta t f_U}\right) - \frac{2\pi^2}{3}(\delta t f_U)^2\right]$$

to generate fit parameters $\Delta t$, $\delta t$, and $$\frac{\Delta Z_p}{Z_p};$$

e) substituting the fit parameter $\delta t$ into the following equation, $$\Delta t = \frac{5}{7fx} - \varepsilon$$

where $$\varepsilon = 2.14 * fx * \delta t^2$$

to produce an improved estimate of $\Delta t$;

f) using the improved estimate of $\Delta t$, and using linear fitting methods, fitting the amplitude and frequency pairs $A_i$ and $f_{Ui}$, to the following equation, $$AMP(f_U) \cong \frac{\Delta Z p}{2\overline{Z p}}\left[\left(1 - \frac{\text{SIN}(\alpha \Delta t f_U)}{\alpha \Delta t f_U}\right) - \frac{2\pi^2}{3}(\delta t f_U)^2\right]$$

to generate new fit parameters $\Delta t$, $\delta t$, $$\frac{\Delta Z_p}{Z_p};$$

g) using the new fit parameters $\Delta t$ and $\delta t$, determining the net thickness of the reservoir by $\Delta_{t_{NET}} = \Delta t - \delta t$; and
h) using the gross thickness $\Delta t$ and the net thickness of the reservoir $\Delta_{t_{NET}} = \Delta t - \delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot V_{p_{INT}}$$

$$\Delta Z = \frac{\Delta T_{ss-2WAY}}{2} \cdot V_{S_{INT}}$$

$$\Delta Z = T_{PS} \cdot \left(\frac{Vp \cdot Vs}{Vp + Vs}\right).$$

6. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;

b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;

c) determining the frequency fx at which the amplitudes are at their maximum value by analyzing the amplitude frequency pairs $A_i$ and $f_{Ui}$;

d) using linear fitting methods, and using $\Delta t=1/(1.4*fx)$, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha\Delta tf_U)}{\alpha\Delta tf_U}\right) - \frac{2\pi^2}{3}(\delta tf_U)^2 + \frac{2\pi^4}{15}(\delta tf_U)^4\right]$$

to generate fit parameters $\Delta t$, $\Sigma\delta t_i$, and $$\frac{\Delta Z_p}{Z_p};$$

e) substituting the fit parameter $\Sigma\delta t_i$ into $$\Delta t = \frac{5}{7fx} - \varepsilon,$$

where $\varepsilon=2.14*fx*\Sigma\delta t_i^2$, to produce an improved estimate of $\Delta t$;

f) using the improved estimate of $\Delta t$, and using linear fitting methods, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha\Delta tf_U)}{\alpha\Delta tf_U}\right) - \frac{2\pi^2}{3}(\delta tf_U)^2 + \frac{2\pi^4}{15}(\delta tf_U)^4\right]$$

to generate new fit parameters $\Delta t$, $\Sigma\delta t_i$, and $$\frac{\Delta Z_p}{Z_p};$$

g) using the new fit parameters $\Delta t$ and $\Sigma\delta t_i$, determining the net thickness of the reservoir by $$\Delta_{t_{NET}} = \Delta t - \sum_i \delta t_i;$$

and h) using the gross thickness $\Delta t$ and the net thickness of the reservoir $$\Delta_{t_{NET}} = \Delta t - \sum_i \delta t_i$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot Vp_{INT}$$

$$\Delta Z = \frac{\Delta T_{ss-2WAY}}{2} \cdot Vs_{INT}$$

$$\Delta Z = T_{PS} \cdot \left(\frac{Vp \cdot Vs}{Vp + Vs}\right).$$

7. A method of determining the net thickness of a reservoir bed, comprising the following steps:

a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;

b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;

c) in the case where only a single embedded layer of thickness $\delta t$ is present, determining the frequency fx at which the amplitudes are at their maximum value by analyzing the amplitude frequency pairs $A_i$ and $f_{Ui}$;

d) using linear fitting methods, and using $\Delta t=1/(1.4*fx)$, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha\Delta tf_U)}{\alpha\Delta tf_U}\right) - \frac{2\pi^2}{3}(\delta tf_U)^2 + \frac{2\pi^4}{15}(\delta tf_U)^4\right]$$

to generate fit parameters $\Delta t$, $\delta t$, and $$\frac{\Delta Z_p}{Z_p};$$

e) substituting the fit parameter $\delta t$ into the following equation, $$\Delta t = \frac{5}{7fx} - \varepsilon,$$

where $\varepsilon=2.14*fx*\delta t^2$ to produce an improved estimate of $\Delta t$;

f) using the improved estimate of $\Delta t$, and using linear fitting methods, fitting the amplitude and frequency pairs $A_i$ and $f_{Ui}$ to the following equation, $$AMP(f_U) \cong \frac{\Delta Zp}{2\overline{Zp}}\left[\left(1 - \frac{SIN(\alpha\Delta tf_U)}{\alpha\Delta tf_U}\right) - \frac{2\pi^2}{3}(\delta tf_U)^2 + \frac{2\pi^4}{15}(\delta tf_U)^4\right]$$

to generate new fit parameters $\Delta t$, $\delta t$, and $$\frac{\Delta Z_p}{Z_p};$$

g) using the new fit parameters $\Delta t$ and $\delta t$, determining the net thickness of the reservoir by $\Delta_{iNET}=\Delta t-\delta t$; and h) using the gross thickness $\Delta t$ and the net thickness of the reservoir $\Delta_{iNET}=\Delta t-\delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot Vp_{INT}$$

$$\Delta Z = \frac{\Delta T_{ss-2WAY}}{2} \cdot Vs_{INT}$$

$$\Delta Z = T_{PS} \cdot \left(\frac{Vp \cdot Vs}{Vp + Vs}\right).$$

8. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$, to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) extracting two amplitude measurements fx and fh and their corresponding frequencies fx and fh from the amplitude frequency data where the first measurement is made where the amplitude is at its maximum (Ax, fx) and the second is for a frequency at least 10% higher than the frequency where the amplitude is at its maximum;
   d) determining $\Sigma\delta\tau$, using the following equation, $$\sum \delta t = (1.013) \sqrt{\frac{C_1 f_x \mathrm{SIN}\left[\frac{10\pi f_h}{7 f_x}\right] + C_2 f_h \frac{A_h}{A_x} - C_3 f_h}{C_4 f_h f_x^2 - C_5 f_h^3 - C_6 f_x^3 \mathrm{SIN}\left[\frac{10\pi f_h}{7 f_x}\right]}}$$

e) determining $\Delta t$, using $$\Delta t = \frac{5}{7 f x} - \varepsilon,$$

where $$\epsilon = 2.14 * f x * \Sigma \delta t_i^2;$$

f) using $\Delta t$ and $\Sigma\delta\tau$, determining the net thickness of the reservoir by using $$\Delta t_{NET} = \Delta t - \sum_i \delta t;$$

and
   g) using the gross thickness $\Delta t$ and the net thickness of the reservoir $$\Delta t_{NET} = \Delta t - \sum_i \delta t,$$

determining the spatial thickness $\Delta Z$ and $\Delta Z_{NET}$ using an equation from the group consisting of the following three equations:

$$\Delta Z = \frac{\Delta T_{pp-2WAY}}{2} \cdot Vp_{INT}$$

$$\Delta Z = \frac{\Delta T_{ss-2WAY}}{2} \cdot Vs_{INT}$$

$$\Delta Z = T_{PS} \cdot \left(\frac{Vp \cdot Vs}{Vp + Vs}\right).$$

9. A method of determining the net thickness of a reservoir bed, comprising the following steps:
   a) filtering a set of seismic data with a plurality of band pass filters, wherein the set is selected from the group consisting of normal moveout corrected and offset stacked seismic traces, or angle stacked seismic traces, with each filter designed to have a common lower frequency $f_L$, and progressively increasing upper frequency $f_{Ui}$ to generate filtered seismic traces;
   b) extracting amplitudes from the group consisting of the filtered seismic traces or the energy envelope of the filtered seismic traces, using a method selected from the group consisting of either a sample-by-sample method or a lobe method, wherein the extracted amplitudes and their corresponding frequencies are $A_i$ and the $f_{Ui}$;
   c) in the case where only a single embedded layer of thickness $\delta t$ is present, extracting two amplitude measurements fx and fh and their corresponding frequencies fx and fh from the amplitude frequency data where the first measurement is made where the amplitude is at its maximum (Ax, fx) and the second is for a frequency at least 10% higher than the frequency where the amplitude is at its maximum;
   d) determining $\delta\tau$, using $$\delta t = (1.013) \sqrt{\frac{C_1 f_x \mathrm{SIN}\left[\frac{10\pi f_h}{7 f_x}\right] + C_2 f_h \frac{A_h}{A_x} - C_3 f_h}{C_4 f_h f_x^2 - C_5 f_h^3 - C_6 f_x^3 \mathrm{SIN}\left[\frac{10\pi f_h}{7 f_x}\right]}}$$

e) determining $\Delta t$, using $$\Delta t = \frac{5}{7 f x} - \varepsilon,$$

where $\epsilon = 2.14 * f x * \delta t^2$
   f) using $\Delta t$ and $\delta\tau$, determining the net thickness of the reservoir by using $\Delta_{iNET} = \Delta t - \delta t$; and
   g) using the gross thickness $\Delta t$ and the net thickness of the reservoir $\Delta_{iNET} = \Delta t - \delta t$, determining the spatial thickness $\Delta Z$ and $\Delta Z_{NET}$ using an equation from the group consisting of the following three equations:

$$\Delta Z = \frac{\Delta T_{pp-2WAY}}{2} \cdot Vp_{INT} \qquad (1)$$

$$\Delta Z = \frac{\Delta T_{ss-2WAY}}{2} \cdot Vs_{INT}$$

$$\Delta Z = T_{PS} \cdot \left(\frac{Vp \cdot Vs}{Vp + Vs}\right).$$

* * * * *